(12) United States Patent
Giri et al.

(10) Patent No.: US 11,995,199 B2
(45) Date of Patent: May 28, 2024

(54) MAPPING CONTAINER USER AND GROUP IDs TO HOST

(71) Applicant: Dell Products L.P., Round Rock, TX (US)

(72) Inventors: Prashanth Giri, Round Rock, TX (US); Michael Brown, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 244 days.

(21) Appl. No.: 17/368,300

(22) Filed: Jul. 6, 2021

(65) Prior Publication Data

US 2023/0011468 A1 Jan. 12, 2023

(51) Int. Cl.
*G06F 12/14* (2006.01)
*G06F 12/0806* (2016.01)
*G06F 21/60* (2013.01)

(52) U.S. Cl.
CPC ........ *G06F 21/604* (2013.01); *G06F 12/0806* (2013.01); *G06F 12/1491* (2013.01); *G06F 2212/1052* (2013.01)

(58) Field of Classification Search
CPC ............... G06F 21/604; G06F 12/0806; G06F 12/1491; G06F 2212/1052
USPC .......................................................... 726/17
See application file for complete search history.

(56) References Cited

U.S. PATENT DOCUMENTS

| | | | | |
|---|---|---|---|---|
| 7,503,063 B1* | 3/2009 | Mishra | ................ | G06F 21/6218 726/5 |
| 8,161,173 B1* | 4/2012 | Mishra | .................... | G06F 9/468 709/227 |
| 10,771,337 B1* | 9/2020 | Das | ........................ | H04L 63/102 |
| 2005/0102299 A1* | 5/2005 | Mair | ....................... | H04L 63/08 |
| 2007/0124374 A1* | 5/2007 | Arun | ...................... | G06Q 10/10 709/204 |
| 2009/0006996 A1* | 1/2009 | Saha | .................... | G06F 21/6218 715/765 |
| 2010/0071026 A1* | 3/2010 | Poulsen | ..................... | G06F 8/38 715/781 |
| 2015/0150025 A1* | 5/2015 | Yuen | ....................... | G06F 9/544 719/312 |

(Continued)

FOREIGN PATENT DOCUMENTS

| | | | | |
|---|---|---|---|---|
| CA | 2604903 A1 | * | 10/2006 | ......... G06F 12/0804 |
| CN | 109923522 A | * | 6/2019 | ............. G06F 21/53 |

OTHER PUBLICATIONS

Mohammadreza Parvizimosaed; A Containerized Integrated Fast IoT Platform for Low Energy Power Management; IEEE: 052021; pp. 318-322.*

*Primary Examiner* — Monjur Rahim
(74) *Attorney, Agent, or Firm* — Jackson Walker L.L.P.

(57) ABSTRACT

An information handling system may include at least one processor and a memory. The information handling system may be configured to: host a container; execute a containerized application within the container, wherein the containerized application executes with privileges associated with a container-internal user; determine an association between the container-internal user and a host user associated with an operating system external to the container, wherein the determining is based on a cache that maintains a mapping between container-internal users and host users; and grant privileges to the containerized application based on the host user.

13 Claims, 4 Drawing Sheets

(56) References Cited

U.S. PATENT DOCUMENTS

| | | | |
|---|---|---|---|
| 2017/0199883 A1* | 7/2017 | Terry | G06F 21/00 |
| 2018/0041598 A1* | 2/2018 | Vats | H04L 63/104 |
| 2018/0203995 A1* | 7/2018 | Yuen | G06F 21/51 |
| 2018/0246812 A1* | 8/2018 | Aronovich | G06F 12/0871 |
| 2019/0158497 A1* | 5/2019 | Diaz Cuellar | H04L 63/108 |
| 2019/0342088 A1* | 11/2019 | Eidson | H04L 9/14 |
| 2020/0117743 A1* | 4/2020 | Shilimkar | G06F 9/45558 |
| 2021/0067537 A1* | 3/2021 | Khanna | G06F 21/31 |
| 2021/0240498 A1* | 8/2021 | Padmanabhan | G06F 16/2246 |

* cited by examiner

MAPPING CONTAINER USER AND GROUP IDs TO HOST

TECHNICAL FIELD

The present disclosure relates in general to information handling systems, and more particularly to management of user IDs and group IDs in a containerized context.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Issues may arise in terms of user IDs and/or group IDs in information handling systems that use multiple distinct management systems. For example, some embodiments of this disclosure may be applicable to virtualized and/or containerized systems such as Docker, Kubernetes, containerd, etc., which may use a virtual machine manager (VMM) such as a hypervisor. In particular, a host system may have one way of keeping track of users and groups, while the container(s) may have a different system.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with the management of user IDs and group IDs in information handling systems may be reduced or eliminated.

In accordance with embodiments of the present disclosure, an information handling system may include at least one processor and a memory. The information handling system may be configured to: host a container; execute a containerized application within the container, wherein the containerized application executes with privileges associated with a container-internal user; determine an association between the container-internal user and a host user associated with an operating system external to the container, wherein the determining is based on a cache that maintains a mapping between container-internal users and host users; and grant privileges to the containerized application based on the host user.

In accordance with these and other embodiments of the present disclosure, a method may include an information handling system hosting a container; the information handling system executing a containerized application within the container, wherein the containerized application executes with privileges associated with a container-internal user; the information handling system determining an association between the container-internal user and a host user associated with an operating system external to the container, wherein the determining is based on a cache that maintains a mapping between container-internal users and host users; and the information handling system granting privileges to the containerized application based on the host user.

In accordance with these and other embodiments of the present disclosure, an article of manufacture may include a non-transitory, computer-readable medium having computer-executable instructions thereon that are executable by a processor of an information handling system for: hosting a container; executing a containerized application within the container, wherein the containerized application executes with privileges associated with a container-internal user; determining an association between the container-internal user and a host user associated with an operating system external to the container, wherein the determining is based on a cache that maintains a mapping between container-internal users and host users; and granting privileges to the containerized application based on the host user.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
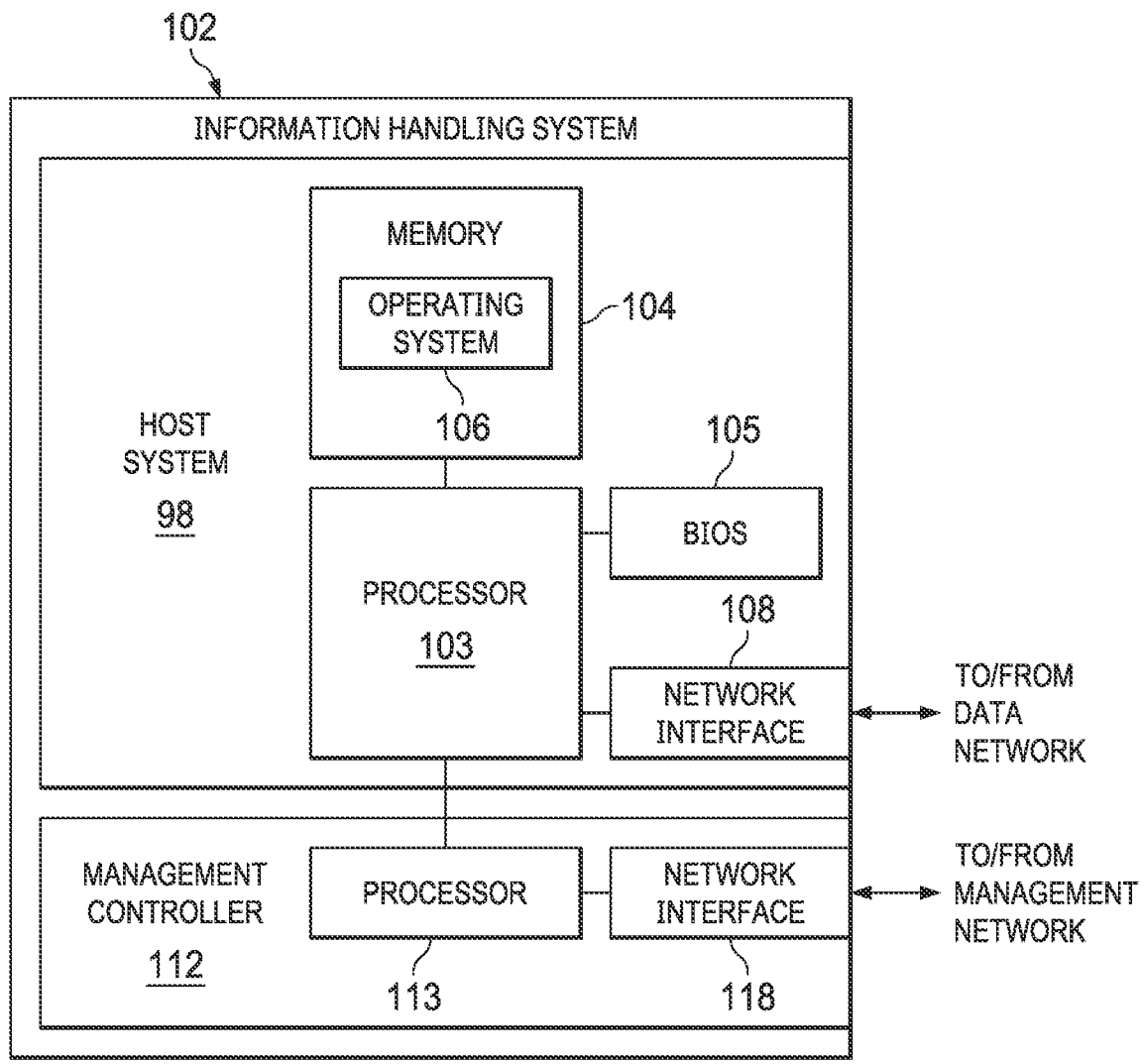
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

In some embodiments, management controller 112 may include a monolithic firmware image that a manufacturer may compile, cryptographically sign, and distribute for installation. However, in other embodiments it may be desirable to have the ability to securely run extension modules on management controller 112. This may allow management controller 112 to provide support for devices that it does not natively support, for example providing power support and thermal data to enable closed-loop thermal management in systems that include components that were not available or not supported when the firmware was created.

For example, such extensions may read raw thermal values and provide processed values to feed into a thermal algorithm executing on management controller 112. Thus, code modules developed by third-party card vendors may be allowed to run inside the environment of management controller 112. Doing so without compromising the security or stability of management controller 112 is an important goal.

In one embodiment, such extension modules may be run inside a containerized system in a Linux environment that executes on management controller 112 (e.g., in Docker containers, similar to the way that containers may be run on a Linux host system). For purposes of clarity and exposition, much of the present disclosure will discuss the situation of running such containers on a management controller as the underlying host system; however, one of ordinary skill in the art with the benefit of this disclosure will appreciate its applicability to containers executing on other systems besides management controllers.

It should be noted that in the present context, the term "host system" should be understood to refer to whichever information handling system hosts the containers, which may include management controller 112 in this example. In particular, the term "host system" in this context does not refer to host system 98 as distinguished from management controller 112. Either host system 98 or management controller 112 may act as a host system in the sense of hosting containers.

In this embodiment, Linux users inside the container may be mapped to Linux users external to the container. An extension manager may be responsible for setting up security permissions. In some embodiments, the extension manager may use the external usernames to set up the security environment for the container-internal users.

In some embodiments, usernames and group names are typically represented as character strings, while user IDs and group IDs are typically represented as numbers. For purposes of clarity and exposition, much of the present disclosure will discuss the example of usernames and user IDs in detail. One of ordinary skill in the art with the benefit of this disclosure will appreciate its relevance to group names and group IDs as well.

In some embodiments, a host-level user may be associated with both a username and an ID number. As is known in the art, the host may include a mechanism for translating between such usernames (strings) and ID numbers. Further, access controls may be expressed based on such these username strings.

Some containerization systems may require that various containers use separate ranges of user IDs, and they may not effectively deal with separate containers that may have identical container-internal user lists. Additionally, some such containerization systems may randomize user IDs, but heretofore there has not been a feasible method for dynamically mapping such random (or pseudorandom) user IDs to usernames. This may cause difficulties, because the security for containers may be based on usernames, but it may be challenging to map dynamic user IDs to such usernames.

Further, some systems may involve a problematic recursive dependency in addressing these issues. In particular, the mapping of internal to external users may be implemented via a Linux component called DBUS in order to specify the security policies for remote procedure calls (RPCs). DBUS is a component that allows communication of messages between multiple processes running concurrently on the same machine.

In general, the DBUS RPC server is designed to allow secure methods of letting different Linux processes talk to each other while enforcing security policies that dictate exactly which methods and paths are exposed. For example, process A might expose multiple APIs on DBUS (e.g., /example/api/1 and /example/api/2). A DBUS security policy might enforce restrictions regarding which processes have access to which API endpoints, such as allowing process B to access only api/1, allowing process C to access only api/2, and allowing process D to access both.

The DBUS server thus needs access to the mappings in order to look up the security details that have been provisioned. However, the base component that provides the mappings may itself implement the lookup using an RPC call via DBUS. Thus the DBUS server itself cannot look up the user mappings, because that would require an infinitely recursive function call.

Some embodiments of this disclosure may address this problem by implementing a mappings cache module that builds a mappings cache in a shared memory segment, wherein the mappings are based on events that the module sees over DBUS for container start and stop. The module may then make this cache available to the DBUS server using a Name Service Switch (NSS) library plugin in a shared memory segment. Thus when the DBUS server (or any other component such as another daemon) needs to map a user ID to a username, it does not need to make recursive RPC calls to get the data.

Accordingly, some embodiments of this disclosure may provide a mapping between dynamic user IDs in dynamic containers to the usernames that exist in the host system. Embodiments may also provide a method of using these host-stable usernames to dynamically set up security policies for the DBUS RPC endpoints to securely control which application programming interfaces (APIs) a containerized app can access, as well as which APIs the containerized app can serve. For example, DBUS policies may be generated dynamically based on resolved user IDs to ensure the most restrictive access to third-party containerized applications.

In some embodiments, systemd-nspawn may be used to run code in a lightweight namespace container, providing a restrictive and secure sandbox environment. Thus third-party code may be run inside a container managed by systemd. Applications running inside the container may interact with applications executing on management controller 112 via DBUS.

The DBUS socket may be safely shared between the applications executing directly on the host system (e.g., management controller 112) and the containerized applications. Several measures may be taken to ensure that applications run securely in a highly restrictive and managed environment. For example, DBUS policies may be used for the containers to allow restrictive access to only specific services on the bus. Further, SELinux policies may be written to tightly control what DBUS services, interfaces, and/or methods the applications inside the container applications can use.

Additionally, the user ID range for the container may be randomized in some embodiments. The user ID range selection for a particular container (which includes all applications inside) may be made at build time or at run time. This mechanism provides high security to the host management controller 112 against attacks from the third-party applications inside the container. Resolving a user ID of the container may be done by mapping it to the corresponding host user ID. For example, user ID 0 (root) inside the container may be mapped to some other user ID number on the host based on a user ID shift. In some embodiments, a particular offset N (referred to as a UID shift) may be chosen such that each user ID number x within a container may map to user ID number x+N on the host.

For more restrictive policies, the DBUS policy rules may be tied to user/group ranges of the container. Because the user/group range is randomized and not known ahead of time, this may require the DBUS policies also to be generated on-the-fly.

Figure 2:
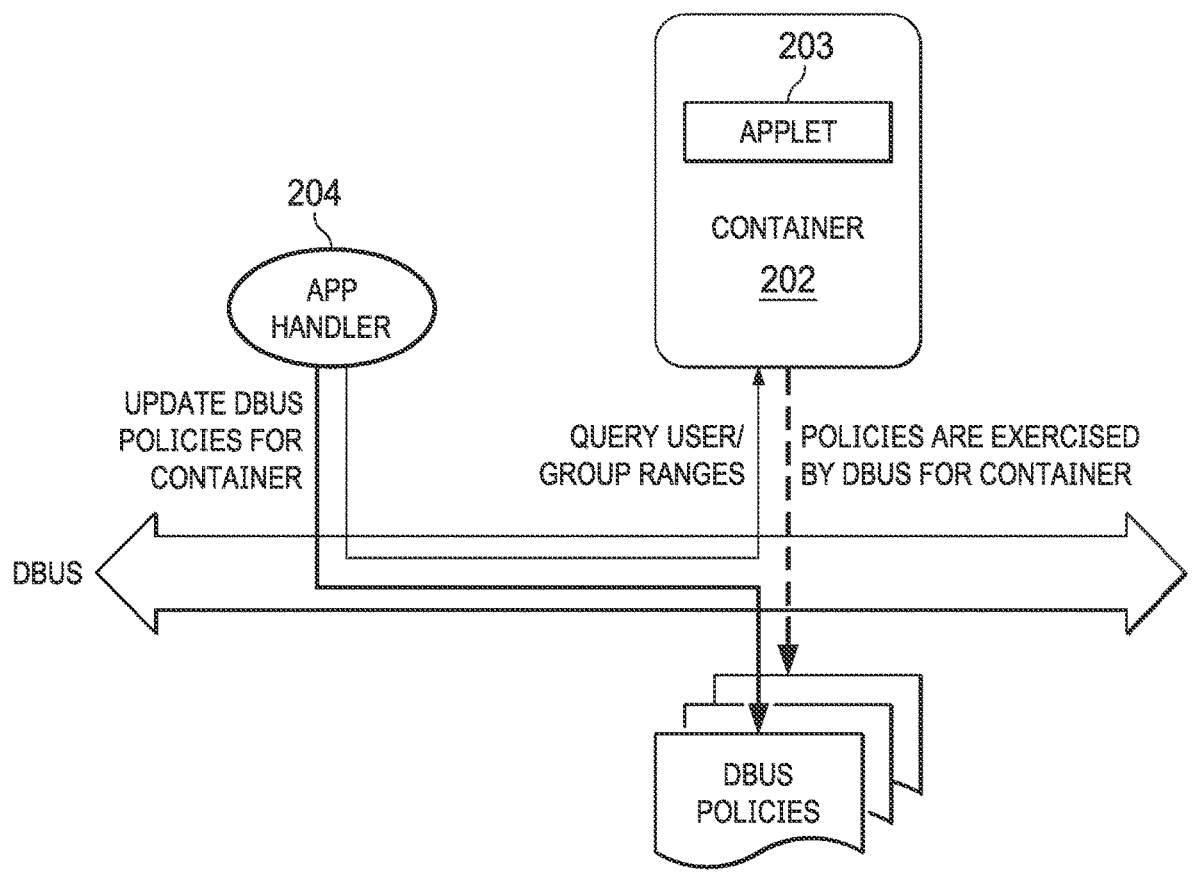
FIG. 2 illustrates a block diagram of an example system architecture, in accordance with embodiments of the present disclosure.

FIG. 2 provides a block diagram illustrating one embodiment. When a container 202 is launched, a random user/group is assigned to the container. The app handler 204 may generate dynamic DBUS policies for container 202 based on the assigned user/group. These DBUS policies may dictate what APIs container 202 should have access to, and/or what APIs container 202 should be restricted from accessing. At the end of the boot process, applet 203 (and any other applications inside container 202) may start up and attempt to communicate over the shared DBUS socket to claim a bus name for itself.

For this to succeed, the DBUS daemon (which may be executing on the host management controller 112) needs to resolve the policies, which in turn requires it to resolve the user/group ranges of the container. This would result in a recursive loop as discussed above, where the DBUS daemon's attempt to resolve the policies requires it first to resolve the user/group range. This would lead to a deadlock, as illustrated by FIG. 3.

Figure 3:
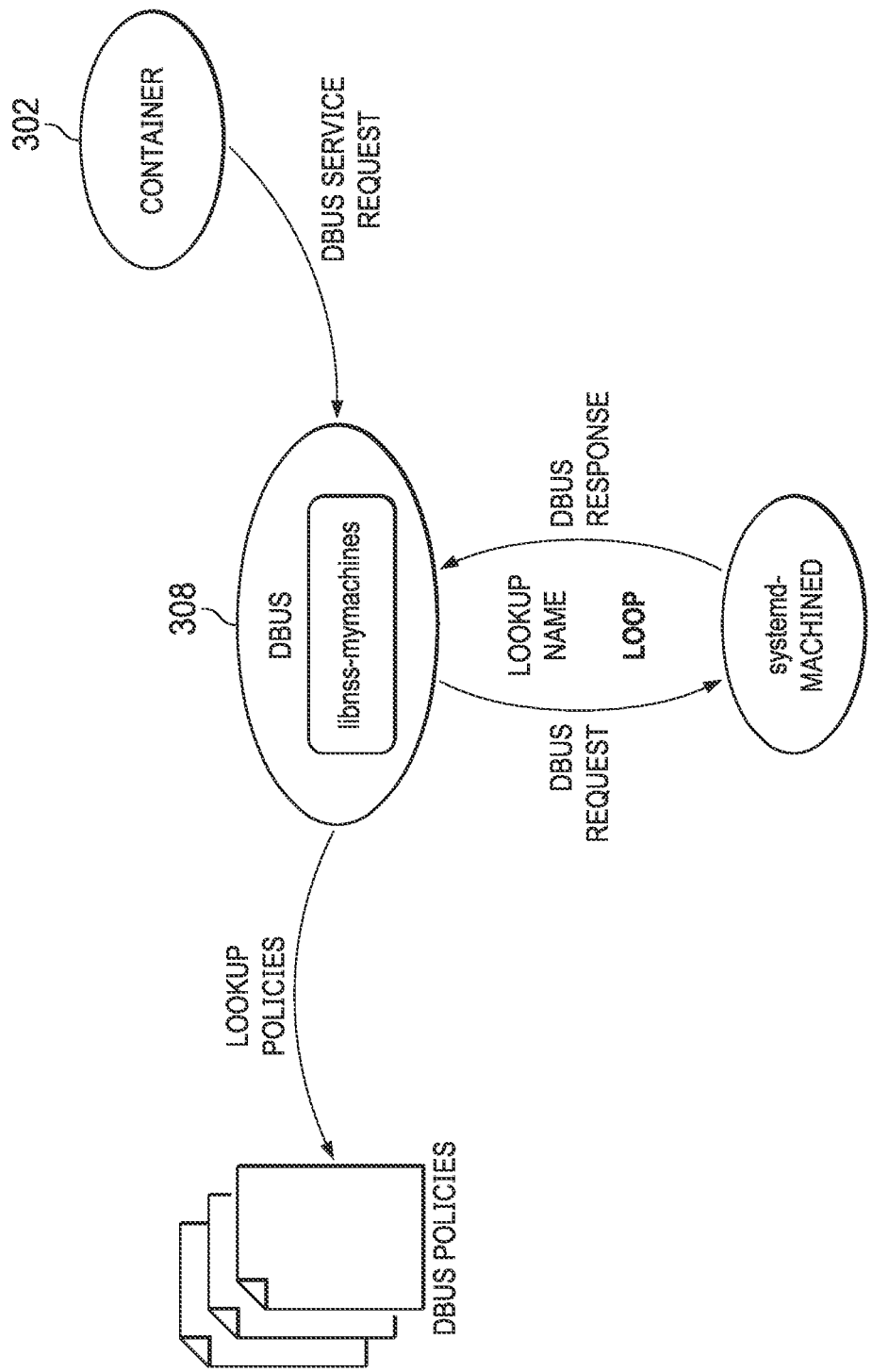
FIG. 3 illustrates a block diagram of an example system architecture with an infinite loop, in accordance with embodiments of the present disclosure.

As shown in FIG. 3, DBUS daemon 308 cannot execute the lookup name request labeled "loop" because it requires a recursive RPC call via systemd-machined.

Figure 4:
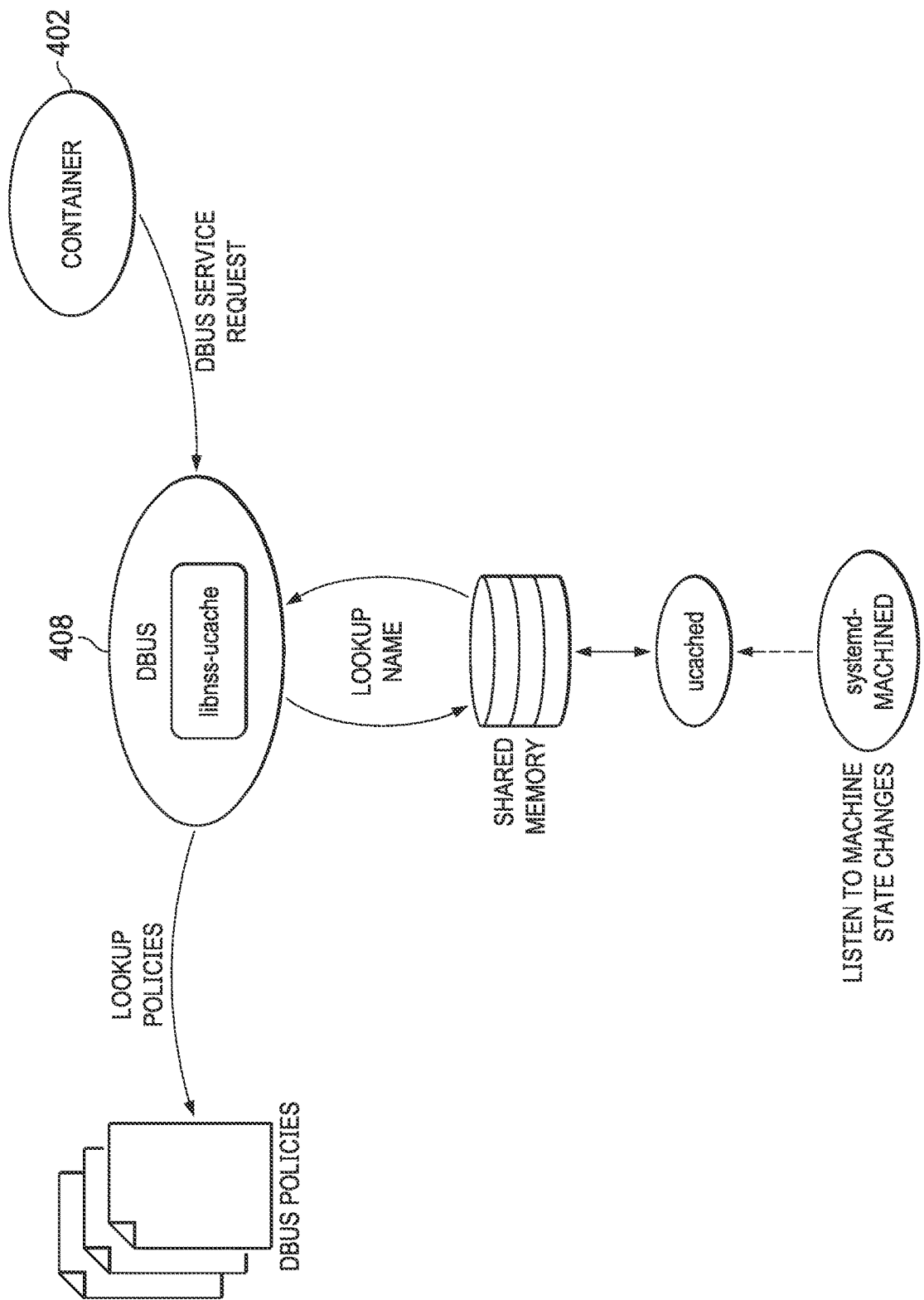
FIG. 4 illustrates a block diagram of an example system architecture that prevents the infinite loop, in accordance with embodiments of the present disclosure.

FIG. 4 illustrates an embodiment that may resolve this issue of using recursive DBUS calls to resolve ID mappings. In this embodiment, DBUS 408 may resolve the ID mappings without having to make a remote procedure call. A new daemon, referred to as ucached, may listen on DBUS 408 for start and/or stop events of containers 402. For each such event, ucached may query the ID mappings between the container-internal user IDs and host-level usernames, creating a shared memory representation of those mappings.

Additionally, a companion NSS library may be loaded into the DBUS daemon. When the DBUS daemon tries to resolve the IDs in question, the new NSS library may consult the shared memory mapping instead of executing the RPC discussed with respect to FIG. 3, thus avoiding the recursive DBUS call. Accordingly, the DBUS policy can refer to the string name of the randomized per-container user ID mappings. The extension manager may update the DBUS policy based on these names to give container 402 access to the APIs it needs and block access to any other APIs.

In one embodiment, the ucached application may start up when the host system boots and listen to a service such as "org.freedesktop.machine1.Manager" for signals such as "MachineNew" and "MachineRemoved". Whenever a new container starts up in the system, the MachineNew signal is emitted. Then in response to the signal, ucached may query for the UID shift for this machine, saving the result in the shared memory cache area. The cache may hold various details about the machine itself, such as the name, hostname, UID/GID shift, image path, etc. Likewise, whenever a container is stopped, a MachineRemoved signal is emitted, and in response, ucached may update its shared memory cache by removing the entry for that container. In this way, ucached may always keep up-to-date information regarding the active containers.

When an application executing within container 402 attempts to connect to the host system's DBUS, the DBUS policies are evaluated first to determine what type of access restrictions should be applied to the container. For this purpose, the container UID/GIDs and usernames may first be resolved. Unlike the situation of FIG. 3 in which DBUS could become deadlocked by recursively calling itself for the UID/GID and username resolution, the embodiment of FIG. 4 may make a reference to ucached's shared memory area to resolve the UID/GID for the container via an nss_ucache plugin. The plugin may be configured to take priority over any other name resolution methods in the nsswitch.conf file to prevent the deadlock from occurring. DBUS may then enforce the policies based on the resolved UID/GIDs and usernames as specified by ucached in the shared memory region.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to:
   host a container;
   execute a containerized application within the container, wherein the containerized application executes with privileges associated with a container-internal user;
   determine an association between the container-internal user and a host user associated with an operating system external to the container, wherein the determining is based on a cache that maintains a mapping between container-internal users and host users; and
   grant privileges to the containerized application based on the host user, wherein:
   the cache is configured to listen for start and stop events associated with containers that are hosted by the information handling system;
   in response to a start event associated with a starting container, the cache is configured to query for a user ID shift associated with the starting container and create a cache entry based on the user ID shift; and
   in response to a stop event associated with a stopping container, the cache is configured to remove a cache entry associated with the stopping container.

2. The information handling system of claim 1, wherein the container-internal user comprises a user identifier (ID) number.

3. The information handling system of claim 2, wherein the user ID number is a random or pseudorandom number.

4. The information handling system of claim 1, wherein the host user comprises a user identifier (ID) number that is usable to determine a host username string.

5. The information handling system of claim 1, wherein the information handling system is a management controller.

6. A method comprising:
   an information handling system hosting a container;
   the information handling system executing a containerized application within the container, wherein the containerized application executes with privileges associated with a container-internal user;
   the information handling system determining an association between the container-internal user and a host user associated with an operating system external to the container, wherein the determining is based on a cache that maintains a mapping between container-internal users and host users; and
   the information handling system granting privileges to the containerized application based on the host user, wherein:
   the cache listens for start and stop events associated with containers that are hosted by the information handling system;
   in response to a start event associated with a starting container, the cache queries for a user ID shift associated with the starting container and create a cache entry based on the user ID shift; and
   in response to a stop event associated with a stopping container, the cache removes a cache entry associated with the stopping container.

7. The method of claim 6, wherein the container-internal user comprises a user identifier (ID) number.

8. The method of claim 7, wherein the user ID number is a random or pseudorandom number.

9. The method of claim 6, wherein the host user comprises a user identifier (ID) number that is usable to determine a host username string.

10. An article of manufacture comprising a non-transitory, computer-readable medium having computer-executable instructions thereon that are executable by a processor of an information handling system for:
    hosting a container;
    executing a containerized application within the container, wherein the containerized application executes with privileges associated with a container-internal user;
    determining an association between the container-internal user and a host user associated with an operating system external to the container, wherein the determining is based on a cache that maintains a mapping between container-internal users and host users; and
    granting privileges to the containerized application based on the host user, wherein:
    the cache is configured to listen for start and stop events associated with containers that are hosted by the information handling system;
    in response to a start event associated with a starting container, the cache is configured to query for a user ID shift associated with the starting container and create a cache entry based on the user ID shift; and
    in response to a stop event associated with a stopping container, the cache is configured to remove a cache entry associated with the stopping container.

11. The article of claim 10, wherein the container-internal user comprises a user identifier (ID) number.

12. The article of claim 11, wherein the user ID number is a random or pseudorandom number.

13. The article of claim 10, wherein the host user comprises a user identifier (ID) number that is usable to determine a host username string.

* * * * *